Sept. 4, 1962 M. G. TEN HAKEN ET AL 3,052,824

FEED-THROUGH CAPACITORS

Filed Nov. 26, 1958

INVENTORS
MELVIN G. TEN HAKEN
WILLIAM S. PARSONS
BERT H. MARKS

BY John W. Michael

ATTORNEY

United States Patent Office 3,052,824

Patented Sept. 4, 1962

3,052,824

FEED-THROUGH CAPACITORS

Melvin G. Ten Haken, William S. Parsons, and Bert H. Marks, Milwaukee, Wis., assignors to Globe-Union Inc., Milwaukee, Wis., a corporation of Delaware Filed Nov. 26, 1958, Ser. No. 776,470
8 Claims. (Cl. 317—101)

This invention relates to feed-through capacitors of the type used widely in ultra high frequency and very high frequency television tuners for by-pass, decoupling and filter circuit applications. More specifically, it relates to improvements in tubular or coaxial type of feed-through capacitors.

This type of capacitor has become increasingly popular as automatic production techniques have advanced throughout the electronics industry. These techniques are designed to speed the assembly of parts into electronic equipment while the original reliability of the equipment is still maintained.

It is an object of this invention to provide a feed-through capacitor of the type which is rugged, reliable, inexpensive to manufacture and easy to assemble into a chassis board.

A further object of this invention is to provide a feed-through capacitor of this type which can be made without the need for costly ceramic pelleting dies from a wide variety of ceramic materials in readily variable lengths and diameters to permit such changes in configuration as may be necessary either to circumvent electrical resonance problems encountered at ultra high frequencies or to provide higher than normal capacitance values.

These objects are obtained by selecting the proper length of extruded ceramic tube of properly proportioned inner and outer diameters, applying electrodes to the inner and outer surfaces and soldering a wire ring around the outer periphery of the tube equidistant from the ends. This makes a symmetrical feed-through capacitor which can be inserted into a hole in the chassis board, either end first, thus eliminating the need for orientation of the part in assembly. The ring performs the function of locating and mounting the capacitor. A solder fillet between the ring and tube eliminates the need of using solder preforms. The ring, by occupying only a small area on the tube, permits a wider range of outer electrode lengths on a minimum length tube. This results in a wide range of capacitance values and a resonant frequency range above those used in ultra high frequency television tuners, thus eliminating problems caused by these resonances.

A more complete understanding of the invention may be had from the folling description when read in connection with the following drawings in which.

Figure 1:
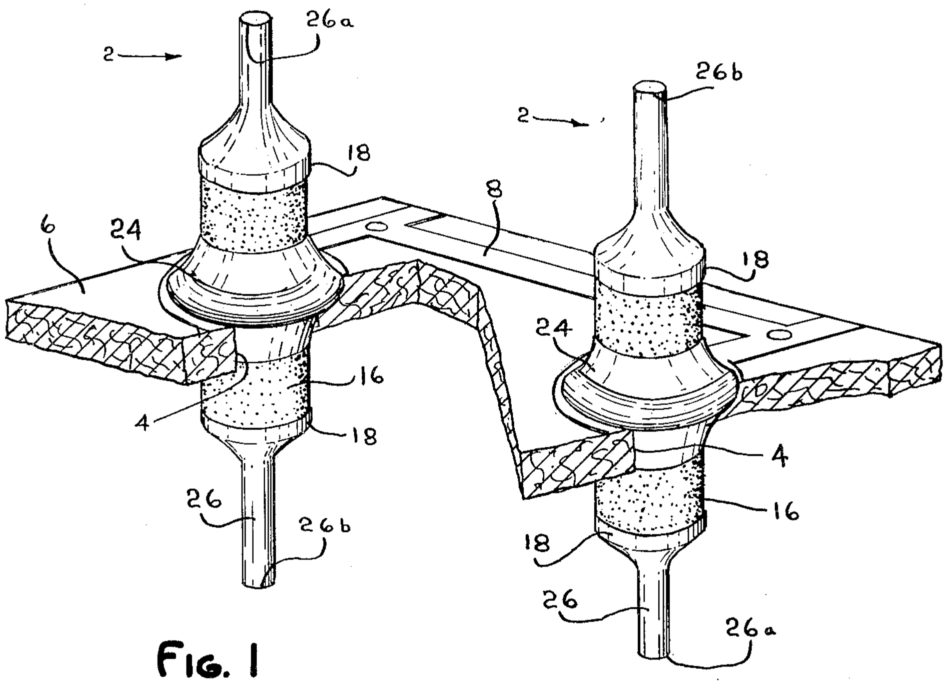
FIG. 1 is a perspective view of symmetrical feed-through capacitors embodying this invention mounted on a chassis board.

Referring now to the drawings, the symmetrical feed-through capacitors indicated generally at 2 are shown greatly enlarged for sake of clarity. Their actual size is relatively small, one example having a tube length of about 0.440 inch and a diameter of about 0.183 inch. The capacitors 2 are mounted in holes 4 in a chassis board 6 which has an electrical circuit 8 on one surface. To illustrate how they may be inserted without orientation, one capacitor has the upper end 26a of its terminal wire up and the other capacitor has its bottom end 26b up.

The feed-through capacitor 2 has a hollow cylindrical dielectric tube 16 which forms the base for the electrodes. This tube may be easily and inexpensively extruded in a large variety of sizes from a multitude of ceramic mixes to provide the required dielectric constant, temperature coefficient and power factor. The electrodes are metallic coatings, such as silver, applied and bonded to the tube in the manner well known in this art. An inner electrode 18 applied to the inner face of the tube may extend over one or both of the ends of the tube onto the outer face. An outer electrode 20 on the outer face of the tube is substantially equidistant from the ends of the tube. The outer electrode 20 is connected to the circuitry 8 and the inner electrode 18 is connected to other lines as required.

Figures 2, 3:
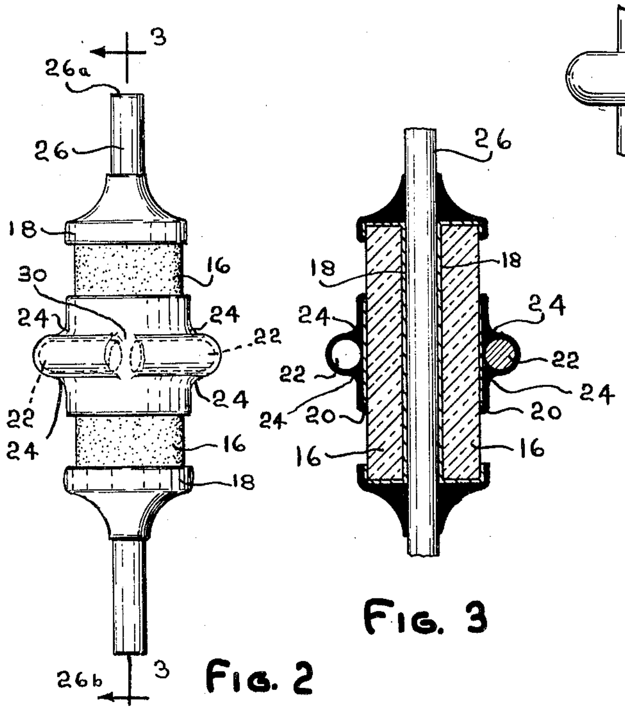
FIG. 2 is a view in front elevation of one of such feed-through capacitors.
FIG. 3 is a sectional view taken on the line 3—3 of FIG. 2.

In order to properly locate and mount the capacitor a formed wire ring 22 is press fitted onto the outer electrode 20 approximately equidistant from either end of the tube. This ring is secured to the outer electrode 20 by solder which forms fillets 24. No. 14 or No. 16 gauge wire has been found suitable for this wire ring 22. As shown in FIG. 2, the ends of ring 22 are slightly spaced as indicated at 30. This is because the ring is slightly sprung as it is press fitted on the tube.

The feed-through capacitor may be furnished with or without a center lead or terminal wire 26 which extends through the tube and is connected to the inner electrode 18 by a solder connection between it and that part of the inner electrode extending over the end of tube.

The feed-through capacitors are inserted into the holes 4 by hand or automatic production techniques and the rings 22 rest against the edge of said holes in contact with the conductive paths surrounding such holes. The board 6 may then be dipped in a hot wax bath or otherwise heated to cause the solder of the fillets 24 to fuse with such conductive path and make an electrical connection as well as providing a mechanically rigid mounting. However, the capacitors may be supplied without any solder fillets or leads and the user may make the connection by a solder dip.

Figure 4:
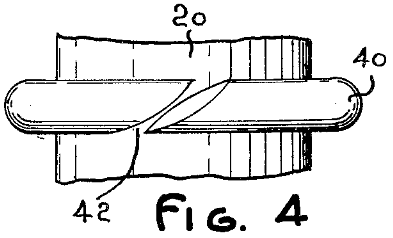
FIG. 4 is a fragmentary view in front elevation of one modification of the invention.

Under some circumstances the solder from the fillets 24 may run down the holes 4 onto the lower side of the board with the possibility of making an undesired connection. To lessen such chance the ring 40, as shown in the modification of FIG. 4, has a diagonal slot 42 between ends. This diagonal slot forms a solder trap or baffle and prevents the solder from dripping down and causing short circuits.

Figure 5:
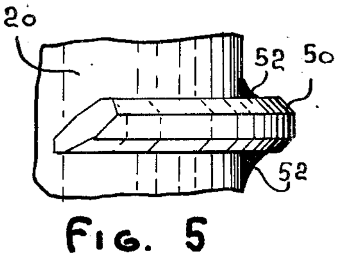
FIG. 5 is a fragmentary view in front elevation of another modification of the invention.

The modification of this invention shown in FIG. 5 uses a wire ring 50 which has a non-circular cross section. It may be hexagonal as shown, square, rectangular, oval, triangular, or other such shape. The different spacial relationships between ring and electrode thus obtainable are used: to regulate the amount of solder in the fillets 52 and thus make a more rugged connection; and to conform with specially designed holes in the board.

From the foregoing description, many of the advantages of this invention should be apparent. Some of these are:

(1) Since the wire ring occupies such a small area on the tube (less than fifteen percent), the outer electrode's length (and therefore the capacitance) may be varied over wide limits;

(2) The small wire ring area permits the use of very short tubes which have a resonant frequency above the range used in ultra high frequency television tuners to eliminate problems from such resonance;

(3) The symmetrical design does not require orientation in assembly; and (4) Tooling and fabrication costs of this unit is at a minimum.

This invention should not be limited to the specific modifications shown but should include all modifications obvious to one skilled in the art upon reading this specification.

We claim:

1. A combination comprising a symmetrical tubular feed-through capacitor and a chassis board having a hole and an electrical conductor bonded to one side of said board and having a part adjacent said hole, said capacitor having a hollow dielectric tube, an inner electrode mounted on the ends and inside face of said tube, an outer electrode mounted on the outer face of said tube and equidistant from the ends of said tube and means equidistant from the ends of said outer electrode for similarly locating said capacitor in electrical and mechanical connection with said part regardless of which end of said tube is inserted into said hole.

2. A capacitor for insertion in a printed circuit board comprising a symmetrical hollow dielectric member having an inner electrode bonded to the inner and end surfaces of said member, an outer electrode bonded to the outer surface of said member equidistant from its ends, a formed wire ring with spaced ends pressed fitted around said outer electrode and electrically connected thereto, said formed wire ring being mounted substantially equidistant from the ends of said outer electrode, said ring occupying less than fifteen percent of the total length of said member.

3. A capacitor as claimed in claim 2 in which said formed wire has a diagonal opening between the ends thereof.

4. A capacitor as claimed in claim 2 in which said formed wire is non-circular in cross-section.

5. A combination comprising the capacitor described in claim 2 and a chassis board, said chassis board having an electrical circuit located on one surface, said capacitor extending through a hole in said chassis board with said formed wire in electrical contact with said circuit.

6. A combination as in claim 5 in which said electrical contact is a circular area around said formed wire.

7. A capacitor as claimed in claim 2 in which said ring is adapted to make contact with said circuit board regardless of which end of said capacitor is inserted in the board.

8. A capacitor as claimed in claim 7 in which there is solder fillet between said formed wire ring and said outer electrode which is of sufficient amount to secure said ring to said electrode and provide solder for fusing said electrode to a conductive path on a chassis board.

References Cited in the file of this patent

UNITED STATES PATENTS

| | | |
|---|---|---|
| 2,440,308 | Storck | Apr. 27, 1948 |
| 2,464,377 | Cohen | Mar. 15, 1949 |
| 2,759,155 | Hackenberg | Aug. 14, 1956 |
| 2,762,989 | Johnson | Sept. 11, 1956 |
| 2,777,039 | Thias | Jan. 8, 1957 |

FOREIGN PATENTS

| | | |
|---|---|---|
| 459,489 | Great Britain | Jan. 8, 1937 |